United States Patent
Weed et al.

(10) Patent No.: US 8,618,928 B2
(45) Date of Patent: Dec. 31, 2013

(54) SYSTEM AND METHODS FOR WIRELESS HEALTH MONITORING OF A LOCATOR BEACON WHICH AIDS THE DETECTION AND LOCATION OF A VEHICLE AND/OR PEOPLE

(75) Inventors: Michael E. Weed, Venice, FL (US); Endre Berecz, Bradenton, FL (US)

(73) Assignee: L-3 Communications Corporation, Sarasota, FL (US)

( * ) Notice: Subject to any disclaimer, the term of this patent is extended or adjusted under 35 U.S.C. 154(b) by 420 days.

(21) Appl. No.: 13/021,133

(22) Filed: Feb. 4, 2011

(65) Prior Publication Data

US 2012/0200460 A1  Aug. 9, 2012

(51) Int. Cl.
*G08B 21/00* (2006.01)

(52) U.S. Cl.
USPC ............... 340/539.1; 340/539.13; 340/636.1; 340/945; 701/468

(58) Field of Classification Search
USPC ............... 340/539.1, 539.13, 539.16, 539.17, 340/539.18, 945, 971, 636.1; 701/468
See application file for complete search history.

(56) References Cited

U.S. PATENT DOCUMENTS

| | | | |
|---|---|---|---|
| 3,140,874 A | 7/1964 | Ames, Jr. | |
| 4,644,494 A | 2/1987 | Muller | |
| 4,951,263 A | 8/1990 | Shope | |
| 5,218,366 A | 6/1993 | Cardamone et al. | |
| 5,517,199 A | 5/1996 | DiMattei | |
| H1560 H | 7/1996 | Gill et al. | |
| RE35,590 E | 8/1997 | Bezos et al. | |
| 6,153,720 A | 11/2000 | Olzak et al. | |
| 6,275,164 B1 | 8/2001 | MacConnell et al. | |
| 6,410,995 B1 | 6/2002 | Grouse et al. | |
| 6,424,884 B1 | 7/2002 | Brooke, Jr. et al. | |
| 6,741,896 B1 | 5/2004 | Olzak et al. | |
| 7,208,685 B2 | 4/2007 | Browning et al. | |
| 7,664,057 B1 | 2/2010 | Wu et al. | |
| 7,746,751 B2 | 6/2010 | Kato et al. | |
| 2002/0035416 A1 | 3/2002 | De Leon | |
| 2002/0144834 A1 | 10/2002 | Purdom | |
| 2003/0018662 A1 | 1/2003 | Li | |
| 2003/0093187 A1 | 5/2003 | Walker | |
| 2003/0109988 A1* | 6/2003 | Geissler et al. | ............... 701/213 |
| 2003/0152145 A1 | 8/2003 | Kawakita | |

(Continued)

OTHER PUBLICATIONS

Schofield, D.W. "Feasibility of Battery Backup for Flight Recorders", Intl. Symposium on Transportation Recorders; May 3-5, 1999, Arlington, VA.

(Continued)

*Primary Examiner* — Jeffery Hofsass
(74) *Attorney, Agent, or Firm* — Fox Rothschild, LLP; Robert J. Sacco

(57) ABSTRACT

Systems (224, 222, 700) and methods (800) for providing wireless health monitoring for a locator beacon (216). The methods involve: coupling a Transponder and Sensor Module (TSM) to the locator beacon such that at least one condition of the locator beacon or a battery (230) of the locator beacon can be remotely monitored; periodically detecting the condition by the TSM (224); and periodically and wirelessly transmitting, from the TSM to a wireless device (222, 700) located in proximity to the TSM, a signal including information describing the condition detected by the TSM. The TSM can include, but is not limited to a transponder (e.g., an RFID tag) and sensor. The wireless device, can include, but is not limited to a transponder interrogator.

30 Claims, 10 Drawing Sheets

(56) References Cited

U.S. PATENT DOCUMENTS

| | | |
|---|---|---|
| 2004/0230352 A1 | 11/2004 | Monroe |
| 2008/0304474 A1 | 12/2008 | Lam |
| 2009/0112381 A1 | 4/2009 | Schwinn et al. |
| 2009/0277683 A1 | 11/2009 | Winterhalter et al. |
| 2009/0319102 A1 | 12/2009 | Winterhalter et al. |
| 2009/0322521 A1 | 12/2009 | Jacobson |
| 2010/0063654 A1 | 3/2010 | Winterhalter et al. |
| 2010/0073493 A1 | 3/2010 | Godfrey et al. |

OTHER PUBLICATIONS http://www.ntsb.gov/aviation; Cockpit Voice Recorders (CVR) and Flight Data Recorders (FDR); Reviewed Sep. 2004.

Information about Related Patents and Patent Applications, see section 6 of the accompanying Information Disclosure Statement Letter, which concerns Related Patents and Patent Applications.

International Search Report mailed Sep. 25, 2012, International Application No. PCT/US2012/024047 in the name of L-3 Communications Corporation, et al.

* cited by examiner

SYSTEM AND METHODS FOR WIRELESS HEALTH MONITORING OF A LOCATOR BEACON WHICH AIDS THE DETECTION AND LOCATION OF A VEHICLE AND/OR PEOPLE

BACKGROUND OF THE INVENTION

1. Statement of the Technical Field

The inventive arrangements relate to electronic devices, and more particularly to systems and method for providing wireless health monitoring for locator beacons and batteries thereof.

2. Description of the Related Art

Most commercial and military aircraft, as well as many civilian aircraft, carry Flight Data Recorders (FDRs) and/or Cockpit Voice Recorders (CVRs). During normal flight operations, the FDR records specific aircraft performance parameters, such as air speed, altitude, vertical acceleration, time, magnetic heading, control-column position, rudder-pedal position, control-wheel position, horizontal stabilizer and fuel flow. The CVR records cockpit voices and other audio such as conversations between ground control and flight crew. Each of the recorders has an enclosure containing an electronic interface, processing circuits and a Crash Survivable Memory Unit (CSMU). The CSMU contains non-volatile memory for storing the flight data and voice data.

In the event of a crash, most of the FDR chassis and inner components may be damaged. However, the CSMU is designed to survive the impact, potential ensuing fire, submersion, and aftermath of various environmental conditions. For example, under the EUROCAE ED-112 standard, the FDR is required to withstand an impact of 3600 g and temperatures up to 1000° C. The data stored on the CSMU should still be recoverable.

Popularly known as the "black box" and regulated by International Civil Aviation Organization (ICAO), FDRs are crucial in investigating and understanding aircraft accidents. In fact, the recovery of the black box is second only to the recovery of survivors and victims. FDRs can also be used to study air safety, material degradation, flying procedures, and jet engine performance. The outer housings of the FDRs are painted bright orange for ready identification. The FDRs are generally located in the tail section of aircrafts to maximize survivability.

To assist in recovery of the FDR, a locator beacon is provided with an FDR. The locator beacon is a self-contained device, i.e., it contains a battery (e.g., a lithium battery) and beacon control circuit necessary to maintain operation. The locator beacon can be manually activated or automatically activated. The locator beacon can be automatically activated by water immersion, high acceleration of a vehicle or craft and/or impact. Once activated, the locator beacon requires no interaction or support from the main body of the FDR. During operation, the locator beacon emits ultrasonic pulses which can be tracked by equipment operated by rescue crews.

The locator beacon is a separate unit, typically cylindrical in shape, which is bolted to an external or internal surface of a housing of the FDR. Notably, there are various advantages to disposing the locator beacon inside the FDR. For example, a locator beacon internal to the FDR may be protected from damage due to the g-forces of the impact, heat of ensuing fire, submersion, and other environmental conditions. In contrast, a locator beacon external to the FDR may be susceptible to g-forces of the impact, heat of ensuing fire, submersion, and other environmental conditions.

The locator beacon is battery operated to ensure functional operation after a crash. The locator beacon and/or battery must be replaced periodically because FDRs have no means of monitoring the charge state of the battery or to recharge the battery. Thus, the service interval of the FDR is in part limited by the locator beacon battery. The service interval is typically a number of years (e.g., 1-2 years). Personnel must physically inspect the locator beacon to determine a recommended replacement time for the locator beacon and/or battery. The recommended replacement time is determined based on the expected life of the battery (e.g., 6 years). The recommended replacement time is often printed on a label disposed on an outer surface of the locator beacon. If the label is not visible upon inspection of the locator beacon, then the locator beacon must be removed from its mounting bracket. If the recommended replacement time indicates that it is not time to replace the locator beacon and/or its battery, then a manual battery check process may be performed to determine one or more conditions of the battery (e.g., a battery charge capacity and/or a battery voltage level).

Despite the advantages of the above described health monitoring techniques of the locator beacon and its battery, they suffer from certain drawbacks. For example, the health monitoring and battery voltage measurements of the locator beacons requires access to the beacon. The location of the beacon may be difficult to access. Also, the health monitoring of the locator beacon is a manual process, which is relatively time consuming and expensive.

SUMMARY OF THE INVENTION

Embodiments of the present invention concern implementing systems and methods for providing wireless health monitoring for a locator beacon. The methods generally involve coupling at least one Transponder and Sensor Module (TSM) to the locator beacon such that at least one condition of the locator beacon ("beacon condition"), at least one condition of a battery of the locator beacon ("battery condition") and/or at least one condition of a surrounding environment ("surrounding environment condition") can be remotely monitored. The beacon condition can include, but is not limited to, a moisture level of an end cap of the locator beacon and/or a temperature of the locator beacon. The battery condition can include, but is not limited to, a battery charge capacity, a battery voltage level and/or a battery temperature. The surrounding environment condition can include, but is not limited to, a temperature of the surrounding environment.

The TSM is coupled to the locator beacon via one of a plurality of techniques. For example, the TSM can be integrated into a label of the locator beacon. The TSM can also have a pressure sensitive adhesive disposed along a peripheral edge thereof for coupling the TSM to the locator beacon and/or a bracket mounting the locator beacon to an object. The TSM can further comprise a flange which may be coupled to a surface of the mounting bracket via an adhesive (e.g., glue or solder). Alternatively or additionally, the TSM can comprise: one or more securing protrusions for frictionally engaging a surface of the mounting bracket; at least one clip for clipping the TSM to the locator beacon or the mounting bracket; and/or at least one clamp for clamping the TSM to the locator beacon or mounting bracket.

The TSM includes a transponder and at least one sensor. The sensor can include, but is not limited to, a voltage sensor, a charge capacity sensor, a moisture sensor and/or a temperature sensor. During operation, the sensor of the TSM periodically detects the condition(s). Thereafter, the transponder of the TSM wirelessly transmits a signal including information describing the detected condition(s) to at least one wireless device. The wireless device can include, but is not limited to, a transponder interrogator an/or a communication device (e.g., a portable or mobile phone).

If the wireless device includes a communication device, then the communication device displays the information on a display thereof so that a user can determine if the locator beacon or the battery needs maintenance or needs to be replaced. The communication device may also automatically make a phone call or send a message (e.g., a text message or email) to another communications device when the information indicates that the locator beacon or battery needs to be replaced. In response to the phone call or message, a new locator beacon or battery can be ordered from a source or retrieved from storage. The new locator beacon or battery can then be supplied to the user for replacing the old locator beacon or battery with the new locator beacon or battery.

If the wireless device includes a transponder interrogator, then the transponder interrogator may analyze the received information to determine the health of the locator beacon or battery. Thereafter, the transponder interrogator may display the information on a display thereof so that the user can determine if the locator beacon or the battery needs maintenance or needs to be replaced. Additionally or alternatively, the transponder interrogator may communicate information indicating the health of the locator beacon or battery to a remote computing device.

According to aspects of the present invention, the transponder interrogator is interfaced with a higher level system (e.g., a flight data recorder of an aircraft). More particularly, the transponder interrogator is electrically coupled to the electronic circuits of the higher level system via a mechanical connector (e.g., solder or an electric connector) such that the transponder interrogator can forward received information describing a detected condition of the locator beacon or battery to the higher level system. In this scenario, the higher level system may analyze the information to determine the health of the locator beacon or battery. The higher level system may also report the health of the locator beacon or the battery to a remote computing device for analysis by a user thereof. The higher level system may further determine if a value describing a detected condition exceeds or falls below a threshold value. If it is determined that the value exceeds or falls below a threshold value, then a system failure is reported to the remote computing device for analysis by the user thereof. The remote computing device can be, but is not limited to, a computing device located in a cockpit of an aircraft. In this scenario, the remote computing device displays the information on a display thereof so that the user can determine if the locator beacon or the battery needs maintenance or needs to be replaced.

According to other aspects of the present invention, the present invention is absent of the transponder interrogator. In this scenario, the present invention comprises a locator beacon and a TSM coupled to the locator beacon. During operation, the sensor of the TSM detects a condition at a predefined time and collects data describing said condition. Subsequently, the transponder of the TSM analyzes the data to determine the health of the locator beacon or battery thereof. If the results of the analysis indicate that the locator beacon or battery need maintenance or replacement, then the transponder automatically and wirelessly communicates information describing the condition to a remotely located wireless communication device (e.g., a central computing device or phone of a maintenance crew member).

BRIEF DESCRIPTION OF THE DRAWINGS

Embodiments will be described with reference to the following drawing figures, in which like numerals represent like items throughout the figures, and in which.

DETAILED DESCRIPTION

Figure 1:
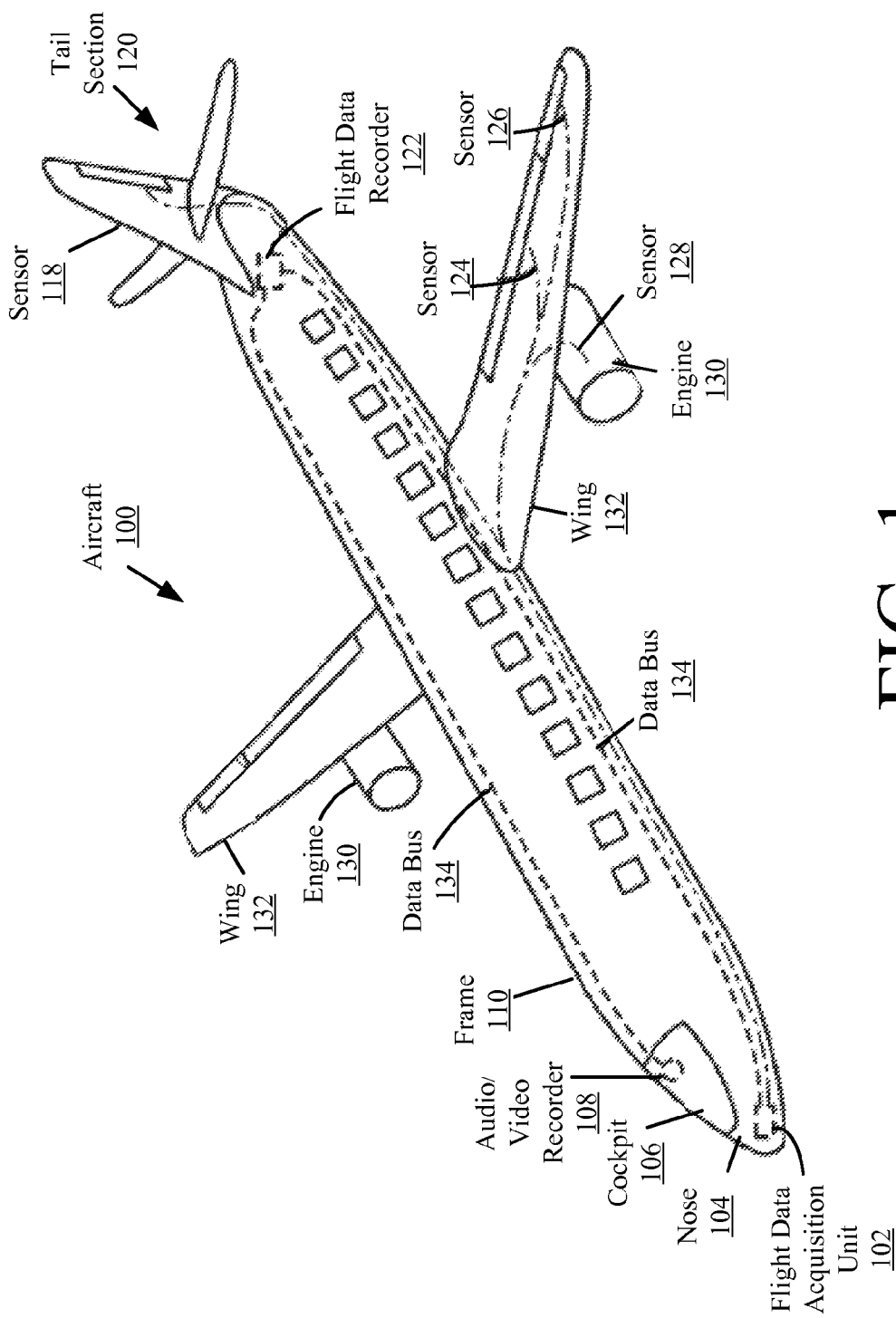
FIG. 1 is a perspective view of an exemplary aircraft with a flight data recorder that is useful for understanding the present invention.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present invention generally concerns implementing systems and methods for providing wireless health monitoring systems for locator beacons. The present invention allows measurement of critical parameters of the locator beacons via a wireless communications link by means of manual interrogation or periodic interrogation by companion portable devices. The present invention also allows the replacement of locator beacons and/or locator beacon batteries on an as-required basis, thereby reducing material costs and labor associated with current maintenance strategies. The wireless health monitoring systems facilitate "stand-off" proximity operations for health monitoring of locator beacons, thereby further reducing labor costs associated with accessing the locator beacons. The wireless health monitoring systems are helpful in locating the locator beacon following an incident (e.g., a crash) by utilizing directional antennas to locate an RF emitter of the wireless health monitoring system. The present invention also provides systems for monitoring the health of a locator beacon and/or its battery without requiring any modifications to higher level systems (e.g., data recorder) and/or brackets mounting the locator beacon to an object (e.g., a data recorder).

The system embodiments are generally configured to facilitate the remote monitoring of at least one condition of the locator beacon ("beacon condition"), at least one condition of a battery of the locator beacon ("battery condition") and/or at least one condition of a surrounding environment ("surrounding environment condition"). In this regard, the system embodiments comprise a locator beacon, a TSM coupled to the locator beacon and at least one wireless device. The TSM can be coupled to the locator beacon via any one of a plurality of techniques. For example, the TSM can be integrated into a label of the locator beacon. The TSM can also have an adhesive disposed along a peripheral edge thereof for coupling the TSM to the locator beacon and/or the mounting bracket. The TSM can further comprise a flange which may be coupled to a surface of the mounting bracket via solder. Alternatively or additionally, the TSM can comprise: one or more securing protrusions for frictionally engaging a surface of the mounting bracket; a clip for engaging a lip of the mounting bracket; and/or a clamp for clamping the TSM to the locator beacon or mounting bracket.

During operation, a sensor of the TSM periodically detects the condition(s). Thereafter, a transponder of the TSM wirelessly transmits a signal including information describing the detected condition(s) to the wireless device(s). Each wireless device can include, but is not limited to, a transponder interrogator (e.g., an RFID reader) or a communication device (e.g., a portable or mobile phone).

If the wireless device includes a communication device, then the communication device displays the information on a display thereof so that a user can determine if the locator beacon or the battery needs maintenance or needs to be replaced. The communication device may also automatically make a phone call or send a message (e.g., a text message or email) to another communications device when the information indicates that the battery needs to be replaced. In response to the phone call or message, a new locator beacon or battery can be ordered from a source or retrieved from storage. The new locator beacon or battery can then be supplied to the user for replacing the old locator beacon or battery with the new locator beacon or battery.

If a wireless device is a transponder interrogator, then the transponder interrogator may analyze the received information to determine the health of the locator beacon or battery. Thereafter, the transponder interrogator may display the information on a display thereof so that the user can determine if the locator beacon or the battery needs maintenance or needs to be replaced. Additionally or alternatively, the transponder interrogator may communicate information indicating the health of the locator beacon or battery to a remote computing device.

In some embodiments of the present invention, the transponder interrogator is interfaced with a higher level system (e.g., a flight data recorder or instrument panel of an aircraft or computer system that monitors aircraft system status). More particularly, the transponder interrogator is electrically coupled to the electronic circuits of the higher level system via a physical or wired connector (e.g., solder or an electric connector) such that the transponder interrogator can forward received information describing a detected condition of the locator beacon or battery to the higher level system. In this scenario, the higher level system may analyze the information to determine the health of the locator beacon or battery. The higher level system may also report the health of the locator beacon or the battery to a remote computing device (e.g., a computing device in the cockpit of an aircraft) for analysis by a user thereof. The higher level system may further determine if a value describing a detected condition exceeds or falls below a threshold value. If it is determined that the value exceeds or falls below a threshold value, then a system failure is reported to the remote computing device for analysis by the user thereof. In this scenario, the remote computing device displays the information on a display thereof so that the user can determine if the locator beacon or the battery needs maintenance or needs to be replaced.

In other embodiments of the present invention, the system is absent of the transponder interrogator. In this scenario, the system comprises a locator beacon and a TSM coupled to the locator beacon. During operation, the sensor of the TSM detects a condition at a predefined time and collects data describing said condition. Subsequently, the transponder of the TSM analyzes the data to determine the health of the locator beacon or battery thereof. If the results of the analysis indicate that the locator beacon or battery need maintenance or replacement, then the transponder automatically and wirelessly communicates information describing the condition to a remotely located wireless communication device (e.g., a central computing device or phone of a maintenance crew member).

The present invention can be used in a variety of applications in which a locator beacon may be employed. Such applications include, but are not limited to, wing aircraft applications, rotor aircraft applications, marine transportation applications, pleasure/recreational applications, scientific applications, commercial applications, land-based vehicle applications and space travel applications. Such aircraft application include commercial jet applications, military aircraft applications, drone applications, ultra-light aircraft applications, blimp applications, balloon applications and flying wing applications. Such marine transportation applications include boat applications, submarine applications and hovercraft applications. Exemplary implementing systems will be described in relation to FIGS. 1-12. Exemplary method embodiments of the present invention will be described below in relation to FIG. 13.

Exemplary System Implementing the Present Invention

Referring now to FIG. 1, there is provided a perspective view of a commercial aircraft 100 that implements the present invention. The aircraft 100 is generally a vehicle that is able to fly by being supported by air. The aircraft 100 counters the force of gravity by using the downward thrust from engines. Accordingly, the aircraft 100 comprises a nose section 104, a cockpit 106, a fuselage or airframe 110, a tail section 120, wings 132 and engines 130.

A Flight Data Acquisition Unit (FDAU) 102 is positioned in the nose section 104 of the aircraft 100 to acquire flight information from corresponding sensors located throughout the aircraft 100. Such flight information can include, but is not limited to, air speed, altitude, vertical acceleration, time, magnetic heading, control-column position, rudder-pedal position, control-wheel position, wing flap position, horizontal stabilizer, fuel flow and landing gear position. FDAUs 102 are well known in the art, and therefore will not be described in detail herein.

Sensors are placed on critical surfaces and system components of the aircraft 100 to convert real-time physical flight measurements into electrical signals for the FDAU 102. Typical aircraft sensors include an engine speed sensor 128, a wing flap position sensor 124, an aileron position sensor 126 and a rudder position sensor 118. The aircraft sensors 118 and 124-128 can be connected to the FDAU 102 through a fly-by-wire data bus 134 or wireless channel. The aircraft sensors 118 and 124-128 are well known in the art, and therefore will not be described in detail herein.

An Audio/Video Recorder (AVR) 108 is provided in the aircraft 100 to collect other flight related information, such as audio and video data. The AVR 108 can be located in the cockpit, passenger area, cargo hold or landing gear compartment of the aircraft 100. AVRs 108 are well known in the art, and therefore will not be described in detail herein.

The FDAU 102 and AVR 108 route flight related information to a Flight Data Recorder (FDR) 122 via the data bus 134, direct link or wireless transmission. FDR 122 is mounted to the airframe 110, typically in the tail section of the aircraft to maximize survivability. FDR 122 can be implemented as a flight data recorder, a Cockpit Voice Recorder (CVR), a Cockpit Voice and Flight Data Recorder (CVFDR) or other combination flight data and audio/video recorder. FDR 122 is applicable to fixed wing and rotor aircraft, including commercial jets, military aircraft, drones, ultra-light aircraft, blimps, balloons and flying wings. The FDR 122 can also be adapted to marine transportation systems such as boats, submarines, hovercraft, also spanning to pleasure/recreational, scientific, commercial, land-based vehicles and space travel. Further details of the FDR 122 is shown in FIGS. 2-9.

Figure 2:
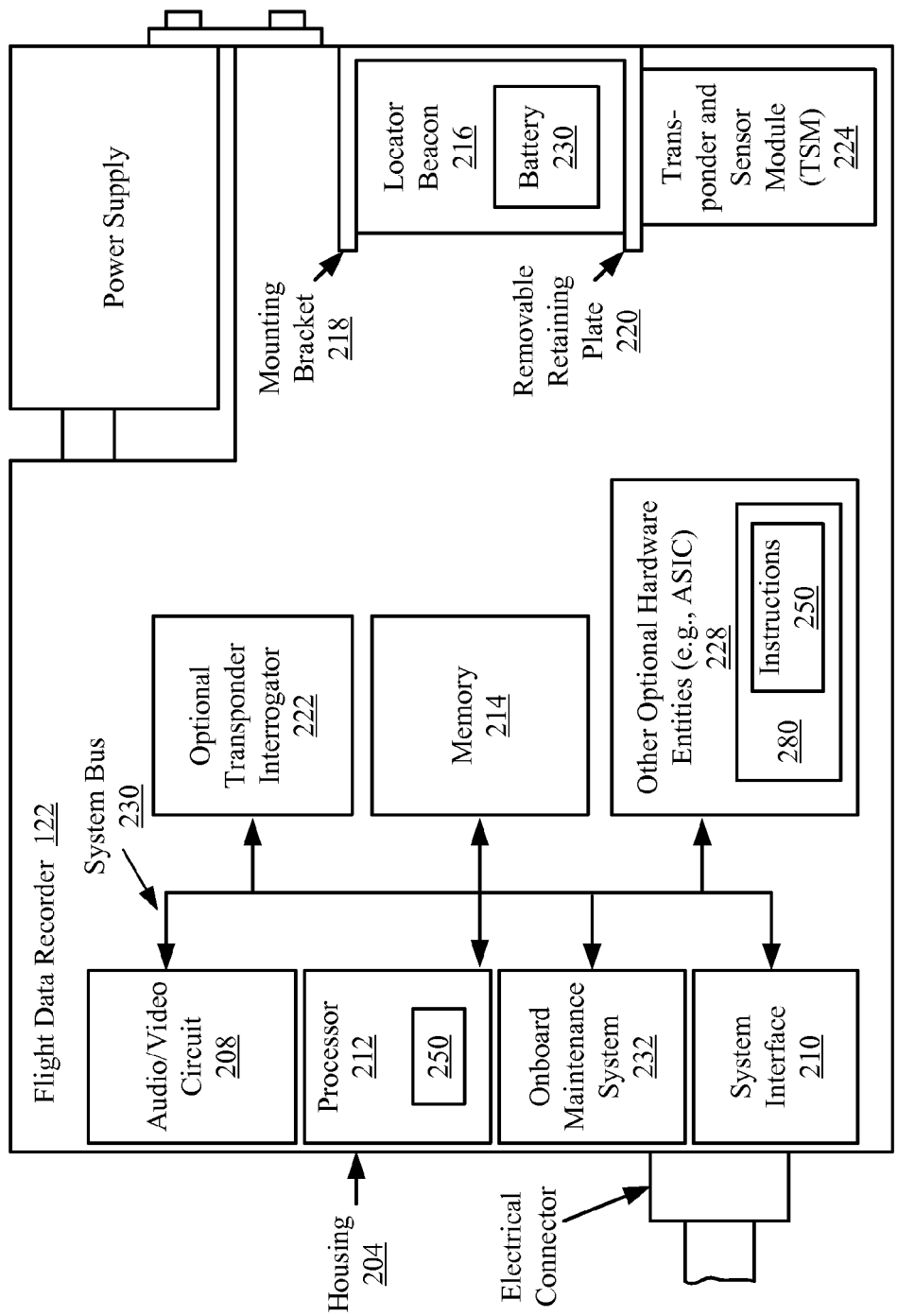
FIG. 2 is a detailed block diagram of an exemplary flight data recorder with a locator beacon that is useful for understanding the present invention.

FIG. 2 is a detailed block diagram of an exemplary embodiment of the FDR 122 that is useful for understanding the present invention. As shown in FIG. 2, the FDR 122 comprises a plurality of components, such a locator beacon 216 and a wireless health monitoring system 222, 224 for the locator beacon 216. The FDR 122 can include more or less components than those shown in FIG. 2. However, the components shown are sufficient to disclose an illustrative embodiment implementing the present invention. The hardware architecture of FIG. 2 represents one embodiment of a representative FDR configured for: periodically detecting a condition of the locator beacon 216, a condition of a battery 230 of the locator beacon 216 and/or a condition of a surrounding environment; wirelessly transmitting a signal including information specifying the detected condition(s) to at least a transponder interrogator 222, a wireless communication device (e.g., communications device 1200 of FIG. 12) and/or a computing device; analyzing data describing the detected condition(s); storing the information in an internal memory device (e.g., memory device 214) or an external memory device of the FDR 122; and reporting the health of the locator beacon 216 and/or its battery 230 to an external device for analysis. As such, the FDR 122 implements method embodiments of the present invention. Exemplary method embodiments will be described in detail below in relation to FIG. 13.

As shown in FIG. 2, the locator beacon 216 is disposed internal to the FDR 122. More particularly, the locator beacon 216 is mechanically coupled to an inner surface of the housing 204 of the FDR 122 via a mounting bracket 218. The mounting bracket 218 comprises a removable retaining plate 220 for facilitating the placement of the locator beacon 216 in the mounting bracket 218 and for retaining the locator beacon 216 within the mounting bracket 218. Embodiments of the present invention are not limited in this regard. For example, the locator beacon 216 can be disposed external to the FDR 122. In this scenario, the locator beacon 216 can be mechanically coupled to an outer surface of the housing 204 via mounting bracket 218. However, there are many advantages of locating the locator beacon 216 internal to the FDR 122, as described above in the background section of this document.

A TSM 224 is attached to or placed in proximity to the locator beacon 216. The TSM can be fixedly or removably attached to the locator beacon 216 via one or more mechanical couplers (described below in relation to FIGS. 4-8). Such mechanical couplers can include, but are not limited to, adhesive (shown in FIG. 5), solder (shown in FIG. 6), securing tabs (shown in FIGS. 7-8), frictional protrusions (shown in FIG. 7, clips (shown in FIG. 8), clamps (shown in FIG. 9) and/or screws (not shown). The TSM 224 is generally configured to: periodically detect a condition of the locator beacon 216, a condition of a battery 230 of the locator beacon 216 and/or a condition of a surrounding environment; optionally analyze information describing a detected condition(s); and wirelessly transmit a signal including certain information to a transponder interrogator 222 coupled to the FDR 122, a portable/mobile communications device (e.g., the communications device 1200 of FIG. 12) in proximity to the FDR 122, a remote computing device (not shown) or a remote communication device (e.g., a telephone). As such, the TSM 224 can include, but is not limited to, a transponder and at least one sensor for detecting a condition of the locator beacon 216, a battery 230 or a surrounding environment. The sensor can include, but is not limited to, a voltage sensor, a charge capacity sensor, a moisture sensor and a temperature sensor. Each of the listed types of sensors are well known in the art, and therefore will not be described herein.

The transponder of the TSM 224 is generally configured to store information received from the sensor(s) of the TSM 224, optionally analyze said information, and wirelessly transmit a signal to an external device when triggered to do so. Accordingly, the transponder includes, but is not limited to, an interface to the sensor(s) of the TSM 224, an antenna, a transceiver, a controller and a memory device. The transponder can be an active transponder, a passive transponder or a hybrid transponder. An active transponder contains a battery and can autonomously transmit a signal when triggered to do so. A passive transponder does not have a battery and requires an external source to generate a signal transmission. The phrase passive transponder and energy harvesting transponder are used interchangeably herein. The phrase "energy harvesting transponder", as used herein, refers to a transponder which requires an external electromagnetic field to initiate a signal transmission and is absent of a battery. A hybrid transponder includes a battery and requires an external source to generate a signal transmission.

According to some embodiments of the present invention, the transponder of the TSM 224 includes a Radio Frequency IDentification (RFID) tag and a sensor. The RFID tag can be "read" by an RFID reader from some distance away, which distance can range from a few inches to several meters. The RFID tag can include an active RFID tag, a passive RFID tag and/or a hybrid RFID tag. The active RFID tag contains a battery and can autonomously transmit a signal when triggered to do so. The passive RFID tag does not have a battery and will not autonomously generate a signal. Instead, the passive RFID tag requires an external source to generate a signal transmission from the RFID tag. The hybrid RFID tag is triggered into operation by an external source, but also utilizes a battery. Embodiments of the present invention are not limited in this regard.

According to some embodiments of the present invention, the TSM 224 includes an ultrasonic receiver (not shown) as part of the health monitoring sensors for the locator beacon 216 or battery 230. The ultrasonic receiver is provided to insure that the locator beacon 216 emitted the required duration, period or level of beacon transmission when the locator beacon 216 is activated through regular tests for health reporting, or as commanded by an external wireless device (e.g., the transponder interrogator 222 or communication device 1200 of FIG. 12). The ultrasonic receiver may also be provided to detect unexpected activation of the locator beacon 216 that may reduce the life of battery 230. Embodiments of the present invention are not limited in this regard.

Referring again to FIG. 2, an optional transponder interrogator 222 may be attached to the FDR 122 for interrogating the transponder of the TSM 224. The transponder interrogator 222 may be provided with the FDR 122 if it is desirable to provide a system capable of: (1) wirelessly communicating condition information to a portable/mobile communication device (e.g., communication device 1200 of FIG. 12); and (2) communicating the condition information to a higher level system, such as the FDR 122. In this regard, the FDR 122 may be absent of the transponder interrogator 222 if only capability (1) is to be provided in a system implementing the present invention. Also, the FDR 122 may be absent of the transponder interrogator 222 if only capability (2) is to be provide in the system. In this scenario, the TSM 224 may be electrically coupled to the FDR 122 via a wired connection. The FDR 122 may further be absent of the transponder interrogator 222 if the TSM 124 is configured to communicate with remotely located computing devices or communication devices, i.e., in proximity to or remote from the FDR 122.

The transponder interrogator 222 may interrogate the TSM 224 in a predefined periodic manner (e.g., every N seconds, minutes, hours, days, months or years). In this scenario, the transponder interrogator 222 can be disposed internal or external to the FDR 122. If the transponder interrogator 222 is external to the FDR 122, then it may be coupled to or interfaced with the FDR 122 via an electrical connector (e.g., a multi-pin electrical connector). Embodiments of the present invention are not limited in this regard. As noted above, the FDR 122 may be absent of the transponder interrogator 222. In this scenario, a portable/mobile communication device (e.g., communication device 1200 of FIG. 12) can be provided for interrogating the transponder of the TSM 224. The transponder interrogator 222 will be described in more detail below in relation to FIG. 11.

According to embodiments of the present invention, the transponder interrogator 222 includes an RFID reader. The RFID reader includes two basic parts: a transceiver with a decoder; and an antenna for the transceiver. The transceiver generates a Radio Frequency (RF) signal that is communicated to the antenna. The transmitted signal from the antenna provides the means for communicating with the RFID tag and (at least in the case of a passive RFID tag) provides the energy needed for the RFID tag to communicate information therefrom. When the RFID tag is exposed to the transmitted signal from the RFID reader, it detects a coded "wake up" signal using a suitable RFID microchip. The RFID microchip transmits an RF signal containing certain information (e.g., a tag identifier and information specifying detected condition(s) of a locator beacon 216, a battery 230 and/or a surrounding environment) stored by the RFID tag. The signal from the RFID tag is then received by the RFID reader and decoded. If the RFID tag has a battery, then the battery can be used to generate a more powerful signal, thereby allowing the RFID tag to communicate over a greater range. After decoding the received signal, the RFID reader may forward the information to an internal memory device 214 of the FDR 122 or an external memory device (e.g., a database) for storage therein. Embodiments are not limited in this regard.

As shown in FIG. 2, the FDR 122 also includes a system interface 210, a processor 212, at least one audio/video circuit 208, an Onboard Maintenance System (OMS) 232, a system bus 230, a memory device 214 connected to and accessible by other portions of the FDR 122 through system bus 230, and hardware entities 228 connected to system bus 230. Hardware entities 228 can include microprocessors, Application Specific Integrated Circuits (ASICs) and other hardware. At least some of the hardware entities 228 perform actions involving access to and use of memory device 214, which can be a Random Access Memory (RAM), a disk driver and/or a Compact Disc Read Only Memory (CD-ROM). System interface 210 allows the FDR 122 to communicate directly or indirectly with external devices.

Processor 212 can be programmed for facilitating the wireless health monitoring operations of the present invention. In this regard, it should be understood that the processor 212 can access and run health monitoring applications (not shown in FIG. 2) and other types of applications installed on the FDR 122. The health monitoring applications are operative to facilitate the management of data stored in memory device 214 and reporting of recorder failures to external devices (e.g., a computing device in the cockpit 106 of the aircraft 100 of FIG. 1). A recorder failure may exist when a voltage reading of the TSM 224 is less than a threshold value (e.g., 6 Volts). In this scenario, a maintenance crew of the aircraft 100 may determine that the locator beacon 216 and/or its battery 230 should be checked and/or replaced.

The OMS 232 can also be programmed for facilitating the wireless health monitoring operations of the present invention. In this regard, it should be understood that the OMS 232 can access and run health monitoring applications (not shown in FIG. 2) and other types of applications installed on the FDR 122. The health monitoring applications are operative to report the health of the FDR 122, the health of the locator beacon 216 and the health of the battery 230 to external devices (e.g., a computing device in the cockpit 106 of the aircraft 100 of FIG. 1) for analysis. A health report for the FDR 122, the locator beacon 216 and/or battery 230 can include, but is not limited to, the following information: an identifier; a date of manufacture; an expiration date; and/or at least one detected condition thereof. The OMS 232 may provide said health reports on a periodic basis (e.g., once per second).

As shown in FIG. 2, the hardware entities 228 can comprise a computer-readable storage medium 280 on which is stored one or more sets of instructions 250 (e.g., software code) configured to implement one or more of the methodologies, procedures, or functions described herein. The instructions 250 can also reside, completely or at least partially, within the memory device 214, the processor 212, and/or the OMS 232 during execution thereof by the FDR 122. The components 214, 212, 232 also can constitute machine-readable media. The term "machine-readable media", as used here, refers to a single medium or multiple media (e.g., a centralized or distributed database, and/or associated caches and servers) that store the one or more sets of instructions 250. The term "machine-readable media", as used here, also refers to any medium that is capable of storing, encoding or carrying a set of instructions 250 for execution by the FDR 122 and that cause the FDR 122 to perform any one or more of the methodologies of the present disclosure.

Figure 3:
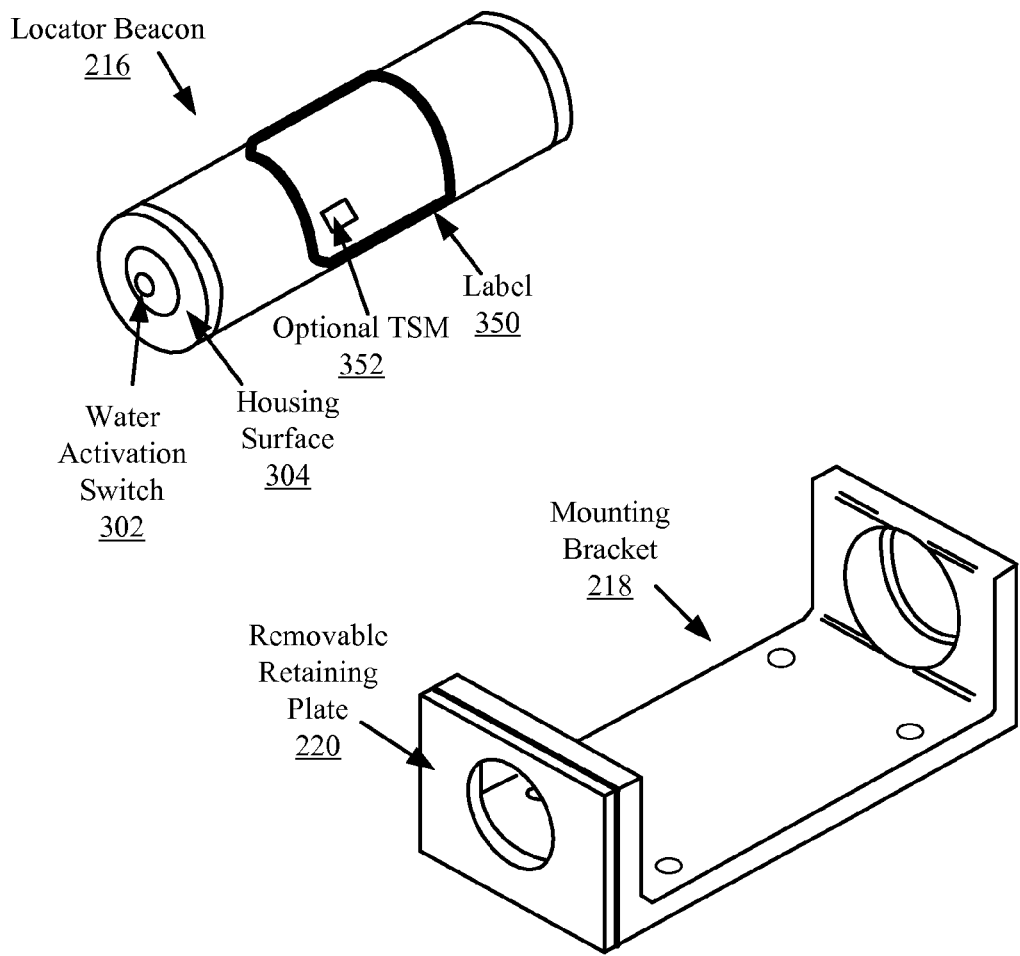
FIG. 3 is a perspective view of a locator beacon removed from a mounting bracket that is useful for understanding the present invention.

Referring now to FIG. 3, there is provided a perspective view of the locator beacon 216 removed from the mounting bracket 218. As shown in FIG. 3, the locator beacon 216 comprises a water activation switch 302 and a label 350. The label 350 is disposed on an exposed housing surface 304 of the locator beacon 216. An optional TSM 352 is integrated within the label 350. The TSM 352 is the same as or similar to TSM 224 described above.

Figure 4:
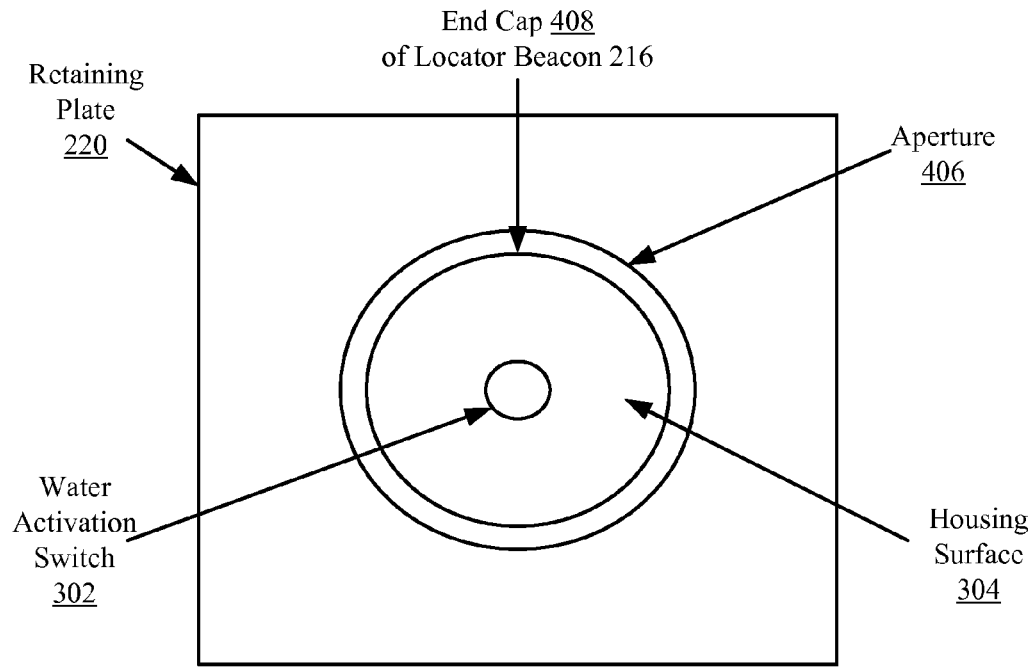
FIG. 4 is a bottom view of a locator beacon disposed in a mounting bracket that is useful for understanding the present invention.

Referring now to FIG. 4, there is provided a bottom view of the locator beacon 216 disposed in the mounting bracket 218 that is useful for understanding the present invention. As shown in FIG. 3, the retaining plate 220 of the mounting bracket 220 has an aperture 406 formed therein. An end cap 408 of the locator beacon 216 at least partially passes through or is visible through the aperture 406. As such, at least a portion of the end cap 408 is accessible via the aperture 406 when the locator beacon 216 is mounted in the mounting bracket 218. The end cap 408 comprises a water activation switch 302. Water activation switches are well known in the art, and therefore will not be described herein. Still, it should be understood that the water activation switch 302 can be used to detect a voltage level of the battery 230 of the locator beacon 216. It should also be understood that the housing of the locator beacon 216 is made of a conductive material (e.g., aluminum). As such, an external surface 304 of the locator beacon 216 can also be used to detect a voltage level of the battery 230 of the locator beacon 216. Alternatively, one or more terminals can be provided on the end cap 408 for facilitating the detection of the battery voltage and/or battery charge capacity. The detected voltage level and/or battery charge capacity can be used to determine if the locator beacon 216 has sufficient operating power.

Figure 5:
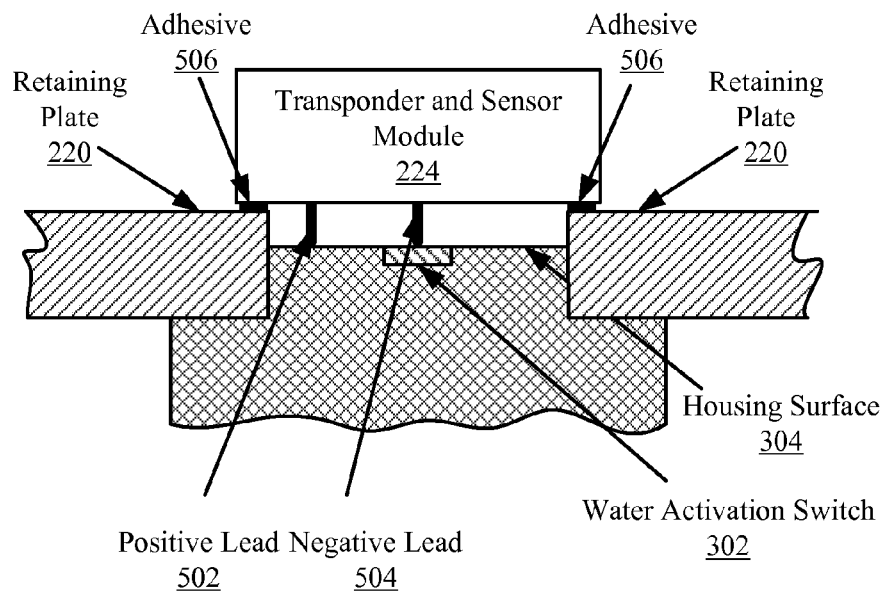
FIGS. 5-9 are schematic illustrations of exemplary embodiments for coupling a transponder and sensor module to a locator beacon that is useful for understanding the present invention.

Referring now to FIG. 5, there is provided a schematic illustration of a first exemplary embodiment for coupling the TSM 224 to the locator beacon 216 that is useful for understanding the present invention. As shown in FIG. 5, the TSM 224 is coupled to the locator beacon 216 via an adhesive 506. In this scenario, the adhesive 506 (e.g., glue) may be disposed on a surface of the retaining plate 220 along a peripheral edge of the aperture 406. Alternatively or additionally, the adhesive 506 is a pressure sensitive adhesive disposed along an peripheral edge of the TSM 224 so as to form a sticker-like configuration. The phrase "pressure sensitive adhesive", as used herein, refers to an adhesive that which forms a bond when pressure is applied to marry the adhesive with the adherend. Such a sticker-like configuration has many advantages. For example, the sticker-like configuration facilitates a quick and easy installation of the TSM 224 without requiring any modifications to the locator beacon 216, mounting bracket 218 and/or higher level system (e.g., FDR 122). Embodiments of the present invention are not limited in this regard.

As also shown in FIG. 5, the TSM 224 comprises a positive lead 502 and a negative lead 504. The positive lead 502 is in electrical contact with an outer surface 304 of the locator beacon 216. The negative lead 504 is in electrical contact with the water activation switch 302. Consequently, a sensor of the TSM 224 can detect a voltage level of the battery 230 of the locator beacon 216, as described above. Embodiments of the present invention are not limited in this regard. For example, at least one of the leads 502, 504 can alternatively be placed in electrical contact with an exposed terminal of the locator beacon 216. Although not shown in FIG. 5, the TSM 224 may also comprise one or more probes for measuring a moisture content of a surrounding environment, a temperature of a surrounding environment, a temperature of a locator beacon 216 and/or a temperature of the battery 230.

Figure 6:
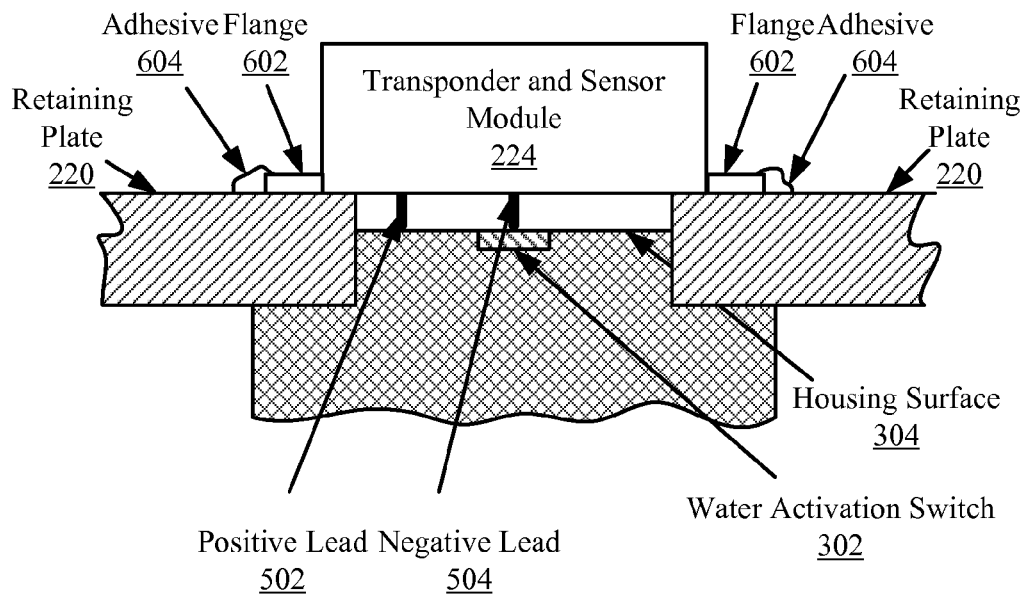

Referring now to FIG. 6, there is provided a schematic illustration of a second embodiment for coupling the TSM 224 to the locator beacon 216 that is useful for understanding the present invention. As shown in FIG. 6, the TSM 224 comprises at least one flange 602. The flange 602 is coupled to an exposed surface of the retaining plate 220 of the mounting bracket 218 via an adhesive 604 (such as glue or solder). Embodiments of the present invention are not limited in this regard.

Figure 7:
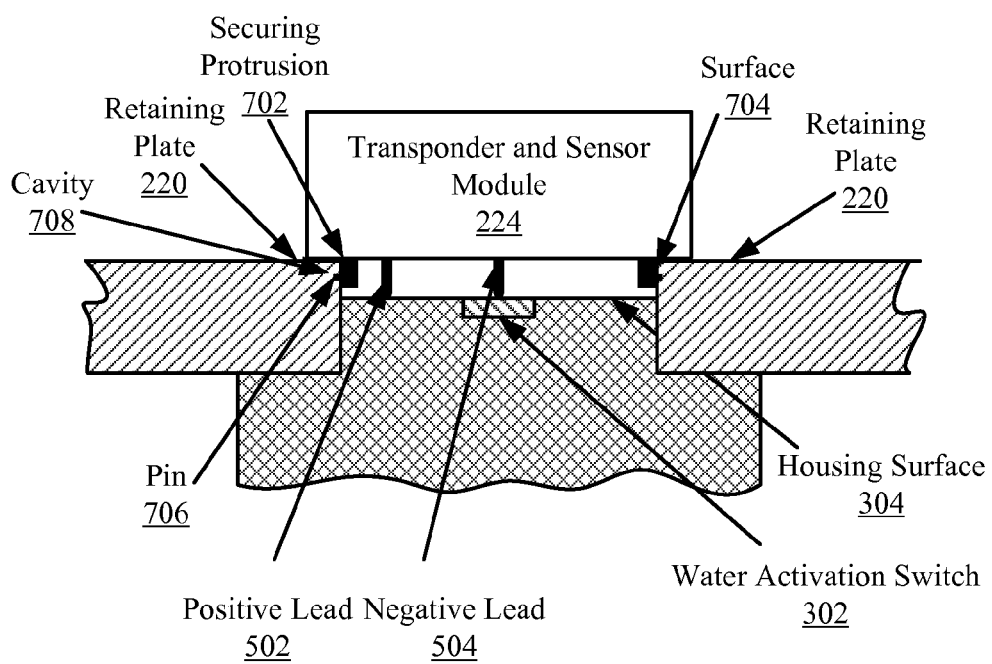

Referring now to FIG. 7, there is provided a schematic illustration of a third embodiment for coupling the TSM 224 to the locator beacon 216 that is useful for understanding the present invention. As shown in FIG. 7, the TSM 224 comprises at least one securing protrusion 704 extending from a bottom surface thereof. The securing protrusion 704 is generally configured for coupling TSM 224 to the locator beacon 216 via retaining plate 220. The securing protrusion 704 is also configured to provide an alignment structure for aligning the negating lead 504 with the water activation switch 302 and the positive lead 502 with the housing surface 304.

If a single securing protrusion 704 is provided, then the securing protrusion 704 may be a ring shaped protrusion having a diameter, radius and circumference that is slightly smaller than the aperture 406 formed in the retaining plate 220. During operation, the ring-shaped protrusion frictionally engages a surface 704 of the retaining plate 220. If two or more securing protrusions 704 are provided, then the protrusions 704 are equally spaced apart. In this scenario, the securing protrusion 704 are placed at locations on a bottom surface of the TSM 224 so that they will frictionally engage surface 704 during operation.

According to embodiments of the present invention, each securing protrusion 704 may include an optional pin 706. The optional pin 706 facilitates the retention of the TSM 224 to the retaining plate 220 of the mounting bracket 218 by engaging the walls of the cavity 708. In this scenario, the retaining plate 220 may need to be modified to include the cavity 708. Embodiments of the present invention are not limited in this regard.

Figure 8:
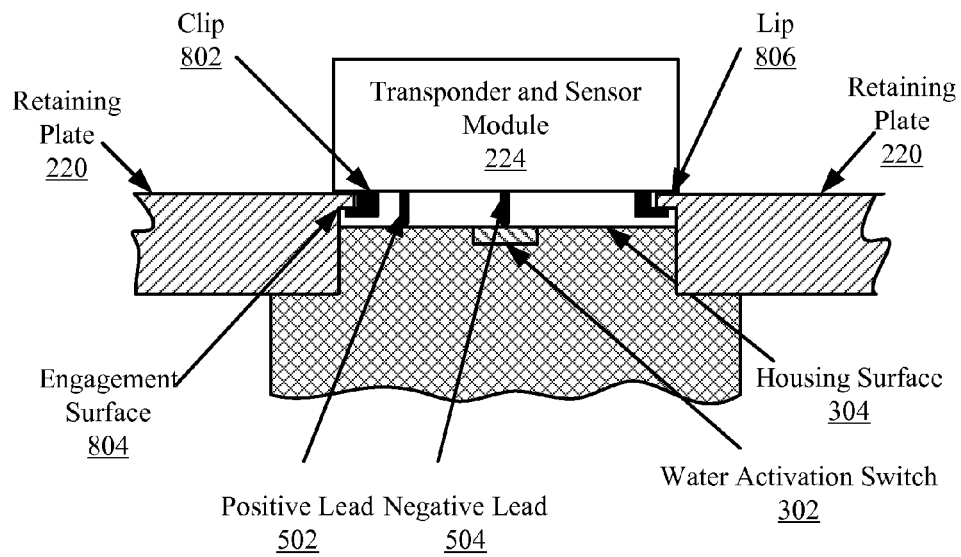

Referring now to FIG. 8, there is provided a fourth embodiment for coupling the TSM 224 to the locator beacon 216 that is useful for understanding the present invention. As shown in FIG. 8, the TSM 224 comprises at least two clips 802. The clips 802 have a generally L-shape and is somewhat flexible. During operation, the clips 802 engage an engagement surface 804 of a lip 806 of the retaining plate 220. In this scenario, the retaining plate 220 may need to be modified to include the lip 806. Embodiments of the present invention are not limited in this regard.

Figure 9:
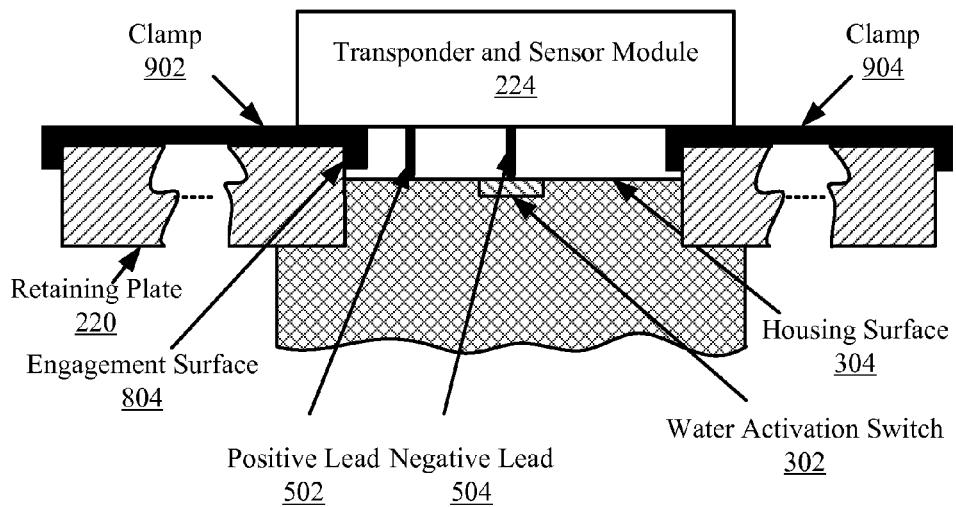

Referring now to FIG. 9, there is provided a fifth embodiment for coupling the TSM 224 to the locator beacon 216 that is useful for understanding the present invention. As shown in FIG. 9, the TSM 224 comprises clamps 902, 904. Each clamp 902, 904 is generally configured to clamp the TSM 224 to the retaining plate 220. Clamps are well known in the art, and therefore will not be described herein. Embodiments of the present invention are not limited in this regard.

Figure 10:
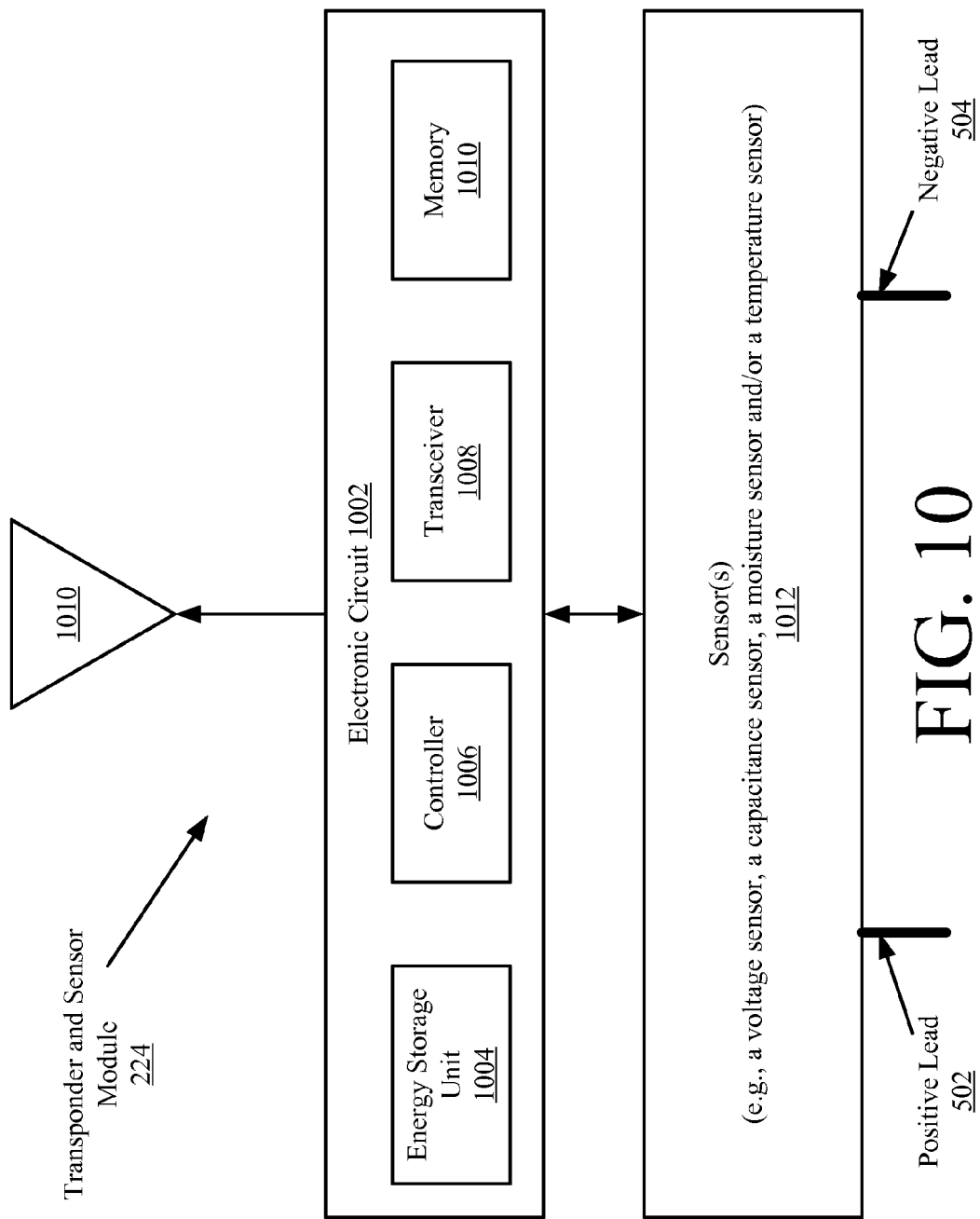
FIG. 10 is a detailed block diagram of an exemplary transponder and sensor module that is useful for understanding the present invention.

Referring now to FIG. 10, there is provided a detailed block diagram of an exemplary architecture of the TSM 224 that is useful for understanding the present invention. The TSM 224 can include more or less components than those shown in FIG. 10. However, the components shown are sufficient to disclose an illustrative embodiment of a TSM.

As noted above, the TSM 224 is configured to facilitate the wireless monitoring of conditions of a locator beacon 216, conditions of a battery 230 of the locator beacon 216 and/or conditions of a surrounding environment. The TSM 224 can also assist in locating the FDR 122 post crash. For example, the TSM 224 could be used to determine if a crew member is in a general location of the FDR 122. In this way, the crew member would know that the FDR 122 exists within a particular geographic area (e.g., within a 100 foot radius of the crew member).

Accordingly, the TSM 224 includes an antenna 1010, an electronic circuit 1002 and at least one sensor 1012. The electronic circuit 1002 includes an energy storage unit 1004, a controller 1006, a transceiver 1008 and a memory device 1010. The sensor 1012 can have at least one exposed lead 502, 504 or probe (not shown) extending therefrom. The sensor 1012 can include, but is not limited to, a voltage sensor, a charge capacity sensor, a moisture sensor and/or a temperature sensor. Although not shown in FIG. 10, the electronic circuit 1002 can also include a secure (or tamper-proof) enclosure. The TSM 224 can be disposable or non-disposable.

According to embodiments of the present invention, the sensor 1012 includes an interface (not shown) comprising an input terminal and an output terminal. The input terminal (not shown) is provided to receive commands for measuring at least one parameter from the electronic circuit 1002. In this way, the electronic circuit 1002 controls when the sensor 1012 is to perform its sensing operations. The output terminal (not shown) is provided to communicate information describing measured parameters. Such information can include, but is not limited to, voltage values, charge capacity values, moisture level values and temperature values. The information can then be stored in memory device 1010 until the electronic circuit 1002 communicates the information to an external device.

If the TSM 224 comprises two or more sensors, then the information from each sensor 1012 is stored in the memory device 1010 according to a particular storage formats. Such storage formats include, but are not limited to, table formats. In this scenario, the information is stored in association with identification data identifying the type of information or sensor from which the information was obtained. For example, a first sensor is a voltage sensor and a second sensor is a temperature sensor. During operation, the first sensor measures a voltage level of a battery. The second sensor measures a temperature of the battery. Thereafter, the first and second sensors communicate the measured values to the electronic circuit 1002 for storage. At the electronic circuit 1002, the voltage level measurement is stored in a table of the memory device 1010 so as to be associated with an identifier of the first sensor or an identifier of a battery voltage parameter. The temperature measurement is stored in a table of the memory device 510 so as to be associated with an identifier of the second sensor or an identifier of a battery temperature parameter. The measurement data and the identifier data can then be transmitted from the TSM 224 to an external device when the TSM 224 is triggered to do so. Embodiments of the present invention are not limited in this regard.

Figure 11:
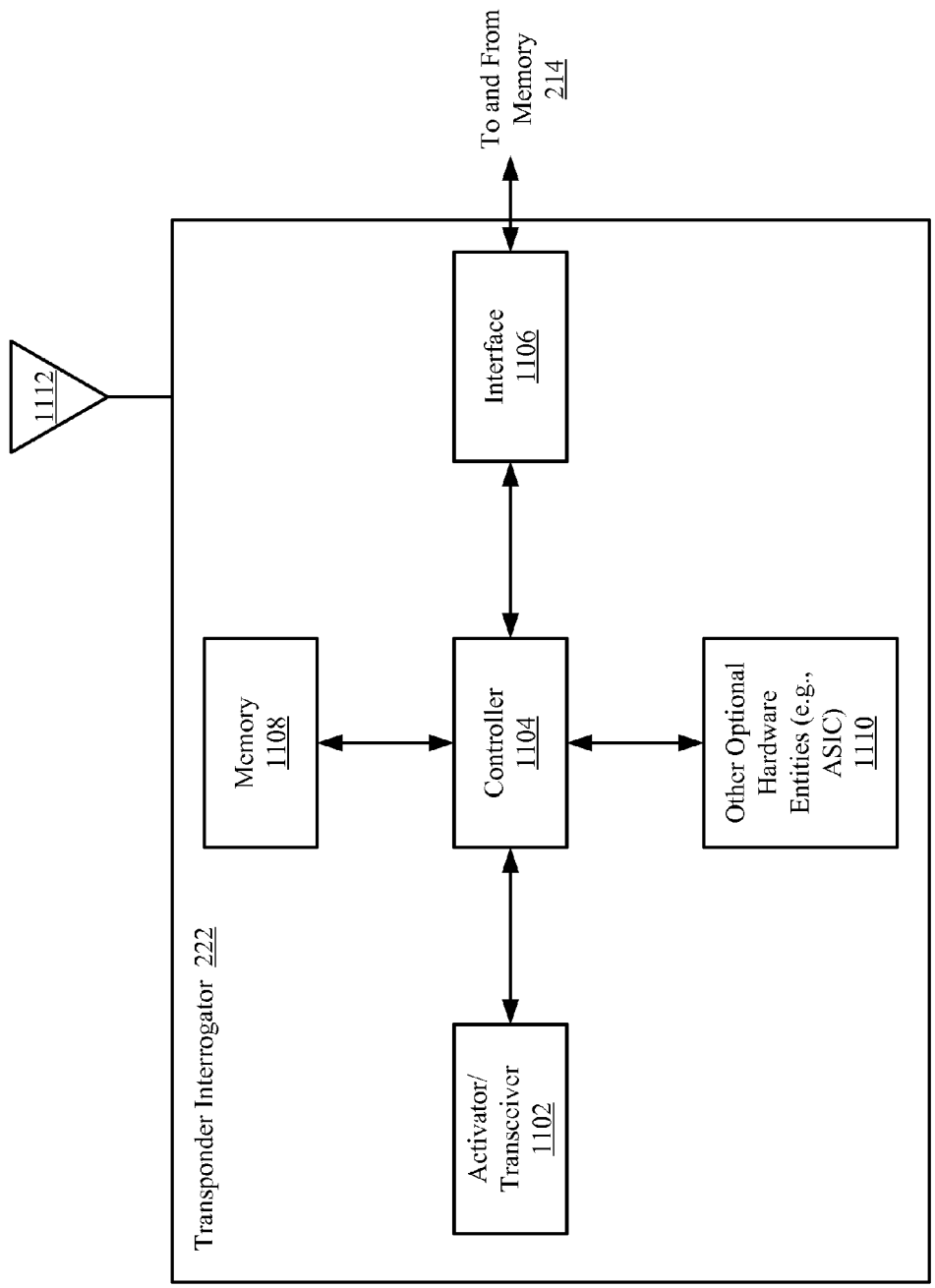
FIG. 11 is a detailed block diagram of an exemplary transponder interrogator that is useful for understanding the present invention.

Referring now to FIG. 11, there is provided a detailed block diagram of the transponder interrogator 222 that is useful for understanding the present invention. As noted above, the transponder interrogator 222 is configured to interrogate the TSM 224 in a predefined periodic manner (e.g., every N seconds, minutes, hours, days, months, or years). In this regard, the transponder interrogator 222 includes an activator/transceiver 1102, a controller 1104, a memory device 1108, an interface 1106, an antenna 1112 and other optional hardware entities 1110. The memory device 1108 includes a software program of operation for the controller 1104.

The activator/transceiver 1102 includes a transmitter for generating a signal. The signal is communicated from the transmitter to the antenna 1112 for transmission to the TSM 224. The signal emanates some predetermined distance away from the transponder interrogator 222. For example, the signal might emanate a few inches to several feet from the transponder interrogator 222. The signal is provided by the activator/transceiver 1102 when information regarding the health of the locator beacon 216 or its battery is to be obtained from the TSM 224.

The activator/transceiver 1102 also includes a receiver for receiving a signal from the TSM 224. The received signal includes, but is not limited to, the following information: an identifier; a date of manufacture; an expiration date; and/or at least one detected condition of a locator beacon, a battery and/or a surrounding environment. The received information can be decoded, stored in memory device 1108 and/or communicated to the interface 1106. The interface 1106 relays the information to an external device (e.g., an internal memory device 214 of the FDR 122).

Figure 12:
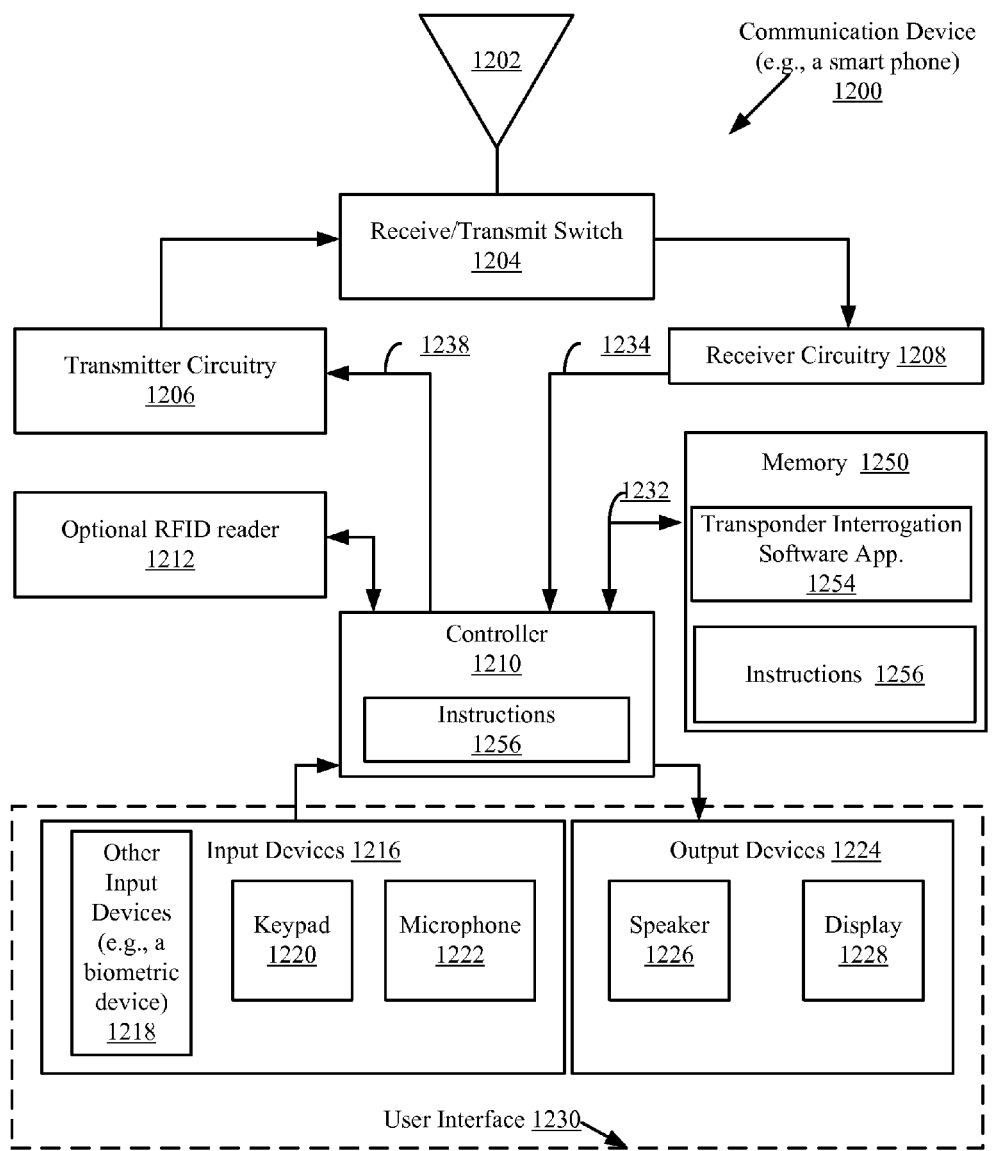
FIG. 12 is a detailed block diagram of an exemplary communication system that is useful for understanding the present invention.

Referring now to FIG. 12, there is provided a detailed block diagram of an exemplary communication system 1200 that is useful for understanding the present invention. The communication device 1200 may include more or less components than those shown in FIG. 12. However, the components shown are sufficient to disclose an illustrative embodiment implementing the present invention. According to embodiments of the present invention, the communication device 1200 is a portable or mobile phone having a transponder interrogation software application 1254 installed thereon. Such portable or mobile phones can include, but are not limited to, smart phones. The phrase "a smart phone", as used herein, refers to a mobile communication device with advanced information access features (e.g., web access, voicemail, calendar, personal digital assistant (PDA) functions, applications, information appliances, etc.). Embodiments of the present invention are not limited in this regard.

The hardware architecture of FIG. 12 represents one embodiment of a representative communication device 1200 configured to facilitate the monitoring of conditions of a locator beacon, a battery of a locator beacon and/or a surrounding environment. In this regard, the communication device 1200 includes an optional RFID reader 1212. The RFID reader 1212 is generally configured to emit radio waves to RFID tags (e.g., TSM 224) within communications range thereof. Upon receiving the signal, the RFID tag sends back its data to the RFID reader 1212.

The communication device 1200 also comprises an antenna 1202 for receiving and transmitting Radio Frequency (RF) signals. A receive/transmit (Rx/Tx) switch 1204 selectively couples the antenna 1202 to the transmitter circuitry 1206 and receiver circuitry 1208 in a manner familiar to those skilled in the art. The receiver circuitry 1208 demodulates and decodes the RF signals received from an external device (e.g., TSM 224) to derive information therefrom. The receiver circuitry 1208 is coupled to a controller (or microprocessor) 1210 via an electrical connection 1234. The receiver circuitry 1208 provides the decoded RF signal information to the controller 1210. The controller 1210 uses the decoded RF signal information in accordance with the function(s) of the communication device 1200.

The controller 1210 also provides information to the transmitter circuitry 1206 for encoding and modulating information into RF signals. Accordingly, the controller 1210 is coupled to the transmitter circuitry 1206 via an electrical connection 1238. The transmitter circuitry 1206 communicates the RF signals to the antenna 1202 for transmission to an external device (e.g., TSM 224) via the Rx/Tx switch 1204.

The controller 1210 stores the decoded RF signal information in a memory device 1250 of the communication device 1200. Accordingly, the memory device 1250 is connected to and accessible by the controller 1210 through an electrical connection 1232. The memory device 1250 may be a volatile memory and/or a non-volatile memory. For example, the memory device 1250 can include, but is not limited to, a Random Access Memory (RAM), a Dynamic Random Access Memory (DRAM), a Static Random Access Memory (SRAM), Read-Only Memory (ROM) and flash memory. The memory device 1250 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

As shown in FIG. 12, one or more sets of instructions 1256 are stored in the memory device 1250. The instructions 1256 can also reside, completely or at least partially, within the controller 1210 during execution thereof by the communication device 1200. In this regard, the memory device 1250 and the controller 1210 can constitute machine-readable media. The term "machine-readable media", as used here, refers to a single medium or multiple media that stores one or more sets of instructions 1256. The term "machine-readable media", as used here, also refers to any medium that is capable of storing, encoding or carrying the set of instructions 1256 for execution by the communication device 1200 and that causes the communication device 1200 to perform one or more of the methodologies of the present disclosure.

The controller 1210 is also connected to a user interface 1230. The user interface 1230 is comprised of input devices 1216, output devices 1224 and software routines (not shown in FIG. 2) configured to allow a user to interact with and control software applications (e.g., transponder interrogation software application 1254) installed on the communications device 1200. Such input and output devices include, but are not limited to, a display 1228, a speaker 1226, a keypad 1220, a directional pad (not shown in FIG. 12), a directional knob (not shown in FIG. 12), a microphone 1222 and other input device 1218. The display 1228 may be designed to accept touch screen inputs. As such, user interface 1230 can facilitate a user-software interaction for launching applications (e.g., software application 1254) installed on the communications device 1200. The user interface 1230 can facilitate a user-software interactive session for authenticating and accessing data stored in the memory device 1250.

The display 1228, keypad 1220, directional pad (not shown in FIG. 12) and directional knob (not shown in FIG. 12) can collectively provide a user with a means to initiate one or more software applications 1254 or functions of the communication device 1200. The software applications 1254 can facilitate the provision of health monitoring services and other types of services to the user using the communication device 1200. As such, the software applications 1254 are operative to facilitate the performance of transponder interrogation operations, data storage operations and data communication operations. The transponder interrogation operations can include, but are not limited to, generating RF signals, communicating RF signals to a TSM (e.g., TSM 224) and receiving information from the TSM. The data communication operations can include, but are not limited to, automatically making a phone call or sending a message (e.g., a text message or email) to another communications device when the information indicates that the battery needs to be replaced.

As evident from the above discussion, the aircraft 100 implements one or more method embodiments of the present invention. The method embodiments of the present invention will be described below in relation to FIG. 13. The method embodiments of the present invention provide implementing systems with certain advantages over conventional systems employing locator beacons. For example, the present invention provides systems capable of providing wireless health monitoring systems for the locator beacons. More particularly, the present invention allows measurement of critical parameters of the locator beacons via a wireless communications link by means of manual interrogation or periodic interrogation by companion portable devices. The present invention also allows the replacement of locator beacons and/or locator beacon batteries on an as-required basis, thereby reducing material costs and labor associated with current maintenance strategies. The wireless health monitoring systems facilitate "stand-off" proximity operations for health monitoring, thereby further reducing labor costs associated with accessing the locator beacons. The wireless health monitoring systems are helpful in locating the locator beacon following an incident (e.g., a crash of an airplane) by utilizing directional antennas to locate an RF emitter of the wireless health monitoring system.

Exemplary Method Embodiments of the Present Invention

Figure 13:
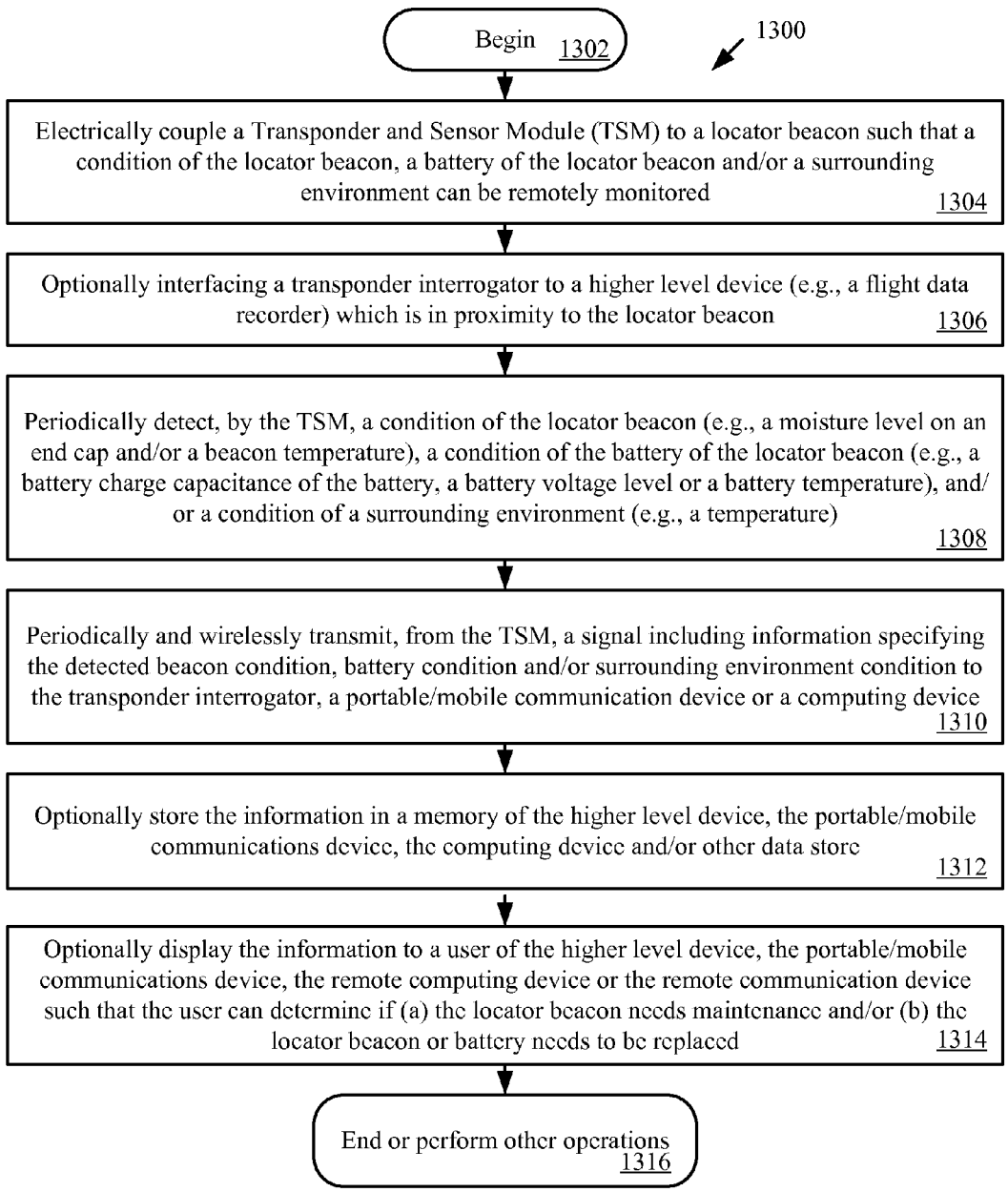
FIG. 13 is a flow diagram of a method for providing wireless health monitoring for locator beacons and batteries thereof.

Referring now to FIG. 13, there is provided a flow diagram of an exemplary method 1300 for providing wireless health monitoring for locator beacons and batteries thereof. As shown in FIG. 8, the method 1300 begins with step 1302 and continues with step 1304. In step 1304, a TSM (e.g., the TSM 224 of FIG. 2) is electrically coupled to a locator beacon (e.g., the locator beacon 216 of FIG. 2) such that a condition of the locator beacon, a battery of the locator beacon (e.g., the battery 230 of FIG. 2) and/or a surrounding environment can be remotely monitored. In a next optional step 1306, a transponder interrogator (e.g., the transponder interrogator 222 of FIG. 2) is interfaced to a higher level device (e.g., the flight data recorder 122 of FIGS. 1-2) which is in proximity to the locator beacon.

Thereafter, step 1308 is performed where the TSM periodically detects a condition of the locator beacon ("beacon condition"), a condition of the battery of the locator beacon ("battery condition") and/or a condition of a surrounding environment ("surrounding environment condition"). The beacon conditions can include, but are not limited to, a moisture level of an end cap of the locator beacon and/or a temperature of the locator beacon. The battery conditions can include, but are not limited to, a battery charge capacity, a battery voltage level and/or a battery temperature. The surrounding environment conditions can include, but are not limited to, a temperature of the surrounding environment.

Upon completing step 1308, step 1310 is performed where the TSM periodically and wirelessly transmits a signal including information specifying the detected beacon condition, battery condition and/or surrounding environment conditions. The signal is transmitted from the TSM to the transponder interrogator in proximity to the TSM, a portable/mobile communication device in proximity to the TSM, a remote computing device and/or a remote communications device.

Subsequent to completing step 1310, optional steps 1312 and 1314 can be performed. In optional step 1312, the information is optionally stored in a memory (e.g., memory device 214 of FIG. 2) of the higher level device (e.g., FDR 122 of FIGS. 1-2), a memory (e.g., memory device 1250 of FIG. 12) of the portable/mobile communication device (e.g., communication device 1200 of FIG. 12), a memory of the remote computing device (not shown), a memory of the remote communication device (not shown), and/or other data store (e.g., a database). In optional step 1314, the information is displayed to a user of the higher level device, the portable/mobile communications device, the remote computing device, and/or the remote communications device such that the user can determine if (a) the locator beacon needs maintenance and/or (b) the locator beacon or battery needs to be replaced. After completing step 1314, step 1316 is performed where the method 1300 ends or other operations are performed.

In light of the forgoing description of the invention, it should be recognized that the present invention can be realized in hardware, software, or a combination of hardware and software. A method for matching gain levels of transducers according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A method for wireless health monitoring of a locator beacon mechanically attached to a housing of a data recorder provided to record specific performance parameters of a vehicle, comprising:
    coupling a first Transponder and Sensor Module (TSM) directly to or adjacent to said locator beacon such that at least one condition of said locator beacon or a battery of said locator beacon can be remotely monitored with assistance of the first TSM, wherein the first TSM comprises a first electronic circuit with a power source separate from the battery of the locator beacon and wherein said coupling is provided by at least one of
        a pressure sensitive adhesive disposed along a peripheral edge of said first TSM,
        at least one securing protrusion extending from said first TSM and frictionally engaging a surface of a bracket used to mount said locator beacon to an object,
        at least one clip clipping said first TSM to said locator beacon or said bracket, and
        at least one clamp clamping said first TSM to said locator beacon or said bracket;
    periodically detecting said condition by said first TSM;
    wirelessly transmitting, from said first TSM to a wireless device electrically coupled to a second electronic circuit of the data recorder and located in proximity to said first TSM, a signal including information describing said condition detected by said first TSM;
    communicating the information from the wireless device to the second electronic circuit via a wired connection;
    using the information by the second electronic circuit to detect a data recorder failure.

2. The method according to claim 1, wherein a second TSM is integrated within a label of said locator beacon.

3. The method according to claim 1, further comprising detecting a condition of a surrounding environment by said first TSM.

4. The method according to claim 1, wherein said data recorder is a flight data recorder.

5. The method according to claim 1, further comprising reporting, by said data recorder, a health of said locator beacon or said battery to a remote computing device for analysis by a user thereof.

6. The method according to claim 1, wherein the data recorder failure is detected by determining if a value describing said condition exceeds or falls below a threshold value; and wherein the data recorder failure is reported to a remote computing device if said value is determined to exceed or fall below said threshold value.

7. The method according to claim 1, further comprising displaying said information by said wireless device so that a user thereof can determine if said locator beacon or said battery needs maintenance or needs to be replaced.

8. The method according to claim 1, wherein said condition comprises a moisture level, a temperature, a battery charge capacity or a battery voltage level.

9. The method according to claim 1, wherein said first TSM comprises a transponder and said wireless device comprises a transponder interrogator.

10. The method according to claim 9, wherein said transponder is an RFID tag and said transponder interrogator is an RFID reader.

11. The method according to claim 9, wherein said transponder is an energy harvesting transponder.

12. The method according to claim 1, further comprising:
analyzing by said first TSM information describing said condition; and
wirelessly transmitting said signal if results of said analyzing step indicate that said locator beacon or said battery need to be replaced.

13. The method according to claim 12, further comprising automatically ordering a new locator beacon or battery in response to the reception of said signal at said wireless device.

14. A system, comprising:
a data recorder configured to record specific performance parameters of a vehicle;
a locator beacon mechanically attached to a housing of the data recorder and comprising a battery; and
a first Transponder and Sensor Module (TSM) comprising a first electronic circuit with a power source separate from the battery of the locator beacon, the first TSM coupled directly to or adjacent to said locator beacon and configured (a) to detect at least one condition of said locator beacon or said battery, and (b) to wirelessly transmit a signal including information describing said condition to a wireless device electrically coupled to a second electronic circuit of the data recorder and located in proximity to or remote from said first TSM;
wherein said first TSM comprises at least one of
a pressure sensitive adhesive disposed along a peripheral edge thereof and configured to bond said first TSM to said locator beacon or a bracket used to mount said locator beacon to an object,
at least one securing protrusion extending therefrom and configured to frictionally engage a surface of said bracket,
at least one clip configured to clip said first TSM to said locator beacon or said bracket, and
at least one clamp configured to clamp said first TSM to said locator beacon or said bracket; and
wherein the second electronic circuit uses the information to detect a data recorder failure.

15. The system according to claim 14, further comprising a label bonded to said locator beacon and having a second TSM integrated therewith.

16. The system according to claim 14, wherein said first TSM is further configured to detect a condition of a surrounding environment.

17. The system according to claim 14, wherein said data recorder is a flight data recorder.

18. The system according to claim 14, wherein said data recorder is configured to report a health of said locator beacon or said battery to a remote computing device for analysis by a user thereof.

19. The system according to claim 14, wherein said data recorder is further configured to: determine if a value describing said condition exceeds or falls below a threshold value; and report the data recorder failure to a remote computing device if said value is determined to exceed or fall below said threshold value.

20. The system according to claim 14, wherein said wireless device is configured to display said information so that a user thereof can determine if said locator beacon or said battery needs maintenance or needs to be replaced.

21. The system according to claim 14, wherein said condition comprises a moisture level, a temperature, a battery charge capacity or a battery voltage level.

22. The method according to claim 14, wherein said first TSM comprises an RFID tag and said wireless device comprises an RFID reader.

23. The method according to claim 14, wherein said first TSM comprises an energy harvesting transponder.

24. The system according to claim 14, wherein said first TSM is further configured to:
analyze information describing said condition; and
wirelessly transmit said signal if results of said analysis indicate that said locator beacon or said battery need to be replaced.

25. The system according to claim 24, wherein said wireless device automatically places an order for a new locator beacon or battery in response to the reception of said signal thereat.

26. A flight data recorder system, comprising:
a recorder chassis;
a data recorder system disposed in said chassis including
a system interface arranged for wired communication with an aircraft, and
a computer processor and a memory in communication with said system interface and arranged to record in the memory information concerning flight data from said aircraft;
a data recorder short range wireless communication circuit;
a locator beacon physically secured to said recorder chassis;
a sensor module secured to the locator beacon, the sensor module comprising
at least one monitoring circuit which is arranged monitor at least one parameter associated with the locator beacon or a battery of said locator beacon, and
a sensor module wireless communication circuit arranged to communicate monitoring data obtained by said monitoring circuit to said data recorder short range wireless communication circuit.

27. The flight data recorder system according to claim 26, wherein said computer processor is configured to communicate with said aircraft using said system interface responsive to said monitoring data.

28. A flight data recorder system, comprising:
a recorder chassis
a data recorder system disposed in said chassis including
a system interface arranged for wired communication with an aircraft, and
a computer processor and a memory in communication with said system interface and arranged to record in the memory information concerning flight data from said aircraft;
a data recorder short range wireless communication circuit;
a locator beacon physically secured to said recorder chassis;
a sensor module secured to the locator beacon, the sensor module comprising
at least one monitoring circuit which is arranged monitor at least one parameter associated with the locator beacon or a battery of said locator beacon, and
a short range sensor module wireless communication circuit arranged to communicate monitoring data obtained by said monitoring circuit to a monitoring device on board or adjacent to said aircraft.

29. The flight data recorder system according to claim 28, wherein said sensor module is removably attached to an exterior of said locator beacon.

30. The flight data recorder system according to claim 29, wherein said sensor module is removably attached by a mechanical fastening arrangement that facilitates removal and attachment of said sensor module without use of tools.

\* \* \* \* \*